Nov. 7, 1933.   W. KAZOIAN   1,933,738
FRUIT JUICE EXTRACTOR
Filed Oct. 8, 1932
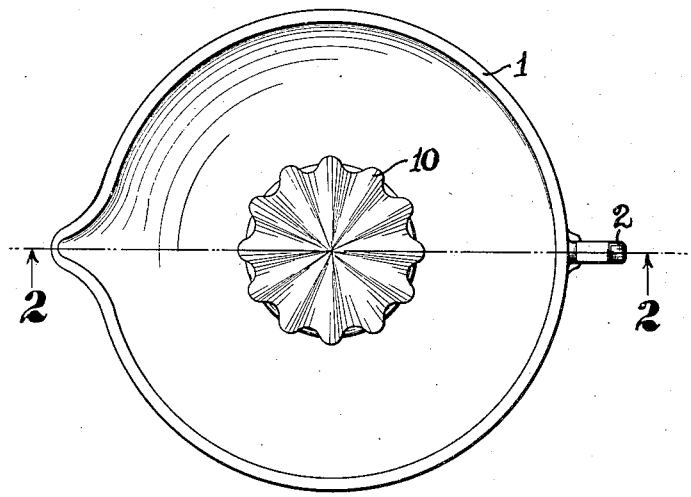
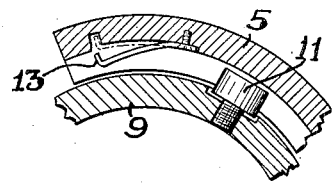
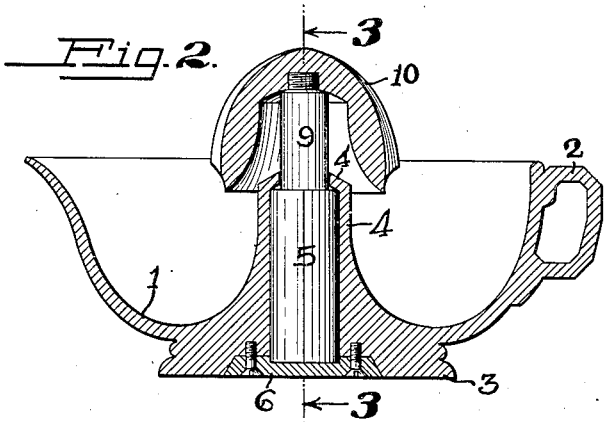
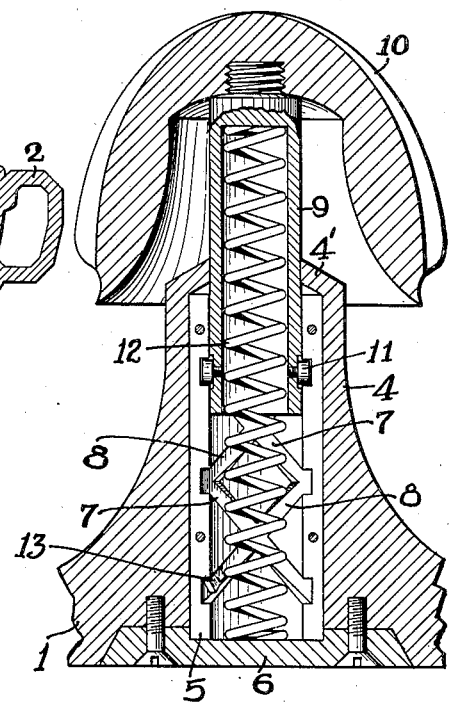
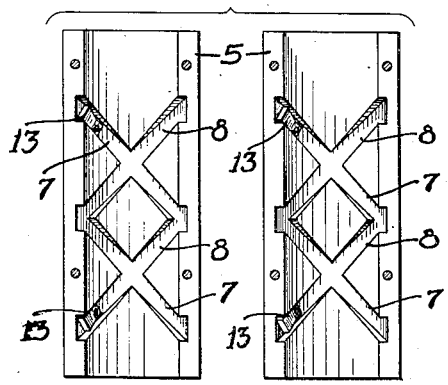
INVENTOR.
Walter Kazoian
BY J. E. Trabucco
ATTORNEY Patented Nov. 7, 1933

1,933,738

UNITED STATES PATENT OFFICE 1,933,738

FRUIT JUICE EXTRACTOR

Walter Kazoian, San Quentin, Calif.

Application October 8, 1932. Serial No. 636,783

2 Claims. (Cl. 146—3)

This invention relates to improvements in fruit juice extractors.

An object of my invention is to provide an improved fruit juice extractor having a rotatable head member which is caused to turn about its axis when a downward pressure is exerted against it.

Another object of my invention is to provide an improved fruit juice extractor having a novel means for conveniently extracting the juice from oranges, lemons or other similar kinds of fruit.

A further object of my invention is to provide an improved fruit juice extractor embodying a rotatable head member adapted to frictionally engage with an orange, lemon or other kind of fruit from which the juice is to be extracted, the said head member having means associated therewith for automatically rotating the same when a downward pressure is exerted against it.

A still further object of my invention is to provide an inexpensive fruit juice extractor which is capable of effectively extracting the juice from fruit without the expenditure of undue effort or time.

Other objects more or less apparent will present themselves or will be specifically pointed out in the description to follow.

In the accompanying drawing:

Fig. 1 is a top plan view of a fruit juice extractor constructed in accordance with my invention;

Fig. 2 is a section taken on the line 2—2 of Fig. 1;

Fig. 3 is an enlarged sectional view taken on the line 3—3 of Fig. 2;

Fig. 4 is an elevation of the two co-operating portions of a tubular collar, which when in assembled position form a tubular collar within which the cylindrical shaft is movably mounted; and Fig. 5 is a sectional view of a portion of the cylindrical shaft and tubular collar, showing one of the spring stop members in open position.

Referring to the drawing the numeral 1 designates a bowl of suitable shape, having a handle 2 at one side and a centrally disposed base portion 3 extending from its underneath side. The bowl is provided centrally with an upwardly disposed flange 4 which has a vertical opening extending therethrough.

Fitting inside the opening in the flange is a tubular collar 5 having its top edge positioned beneath and in contact with an annular projecting part 4' extending inwardly from the top edge of the said flange. The collar 5 is held within the opening in the flange 4 by a base plate 6 secured to the base portion 3 by screws or other suitable means. The tubular collar 5 is made up of two sections, as shown in Fig. 4, which are joined together by suitable means such as dowel pins. The inside surface of the tubular member is provided with a right hand spiral groove 7 and a left hand spiral groove 8, the said grooves intersecting each other at points intermediate their ends. The grooves 7 and 8 come together at their top and bottom ends, thereby providing endless channels within which a pair of rollers may travel, as will be later described.

Extending through the top of the opening in the tubular collar 5 is a cylindrical shaft 9 having a reduced threaded portion at its top end upon which is screwed a corrugated head member 10. Secured at opposite sides of the shaft 9 at points adjacent its lower end are two outwardly projecting rotatable rollers 11 which are adapted to extend into the grooves 7 and 8 of the collar 5. Positioned inside the cylindrical shaft 9, with its top end bearing against the closed top end of the shaft and its lower end resting on the base plate 6, is a spiral spring 12. The spring 12 normally maintains the shaft 9 in a position with its lower end well above the base plate 6, thereby causing the corrugated head member 10 to be normally held in elevation above the top end of the flange 4 of the bowl.

When it is desired to extract the juice from an orange, lemon or other kinds of fruit, the inside portion of the same is placed in contact with the corrugated head member 10 and a downward pressure is exerted thereon. As the head member 10 and its shaft 9 are forced in a downward direction against the tension of the spring 12, the rollers 11 move downwardly in the spiral grooves 8 thereby causing the said shaft and head member to rotate in a clockwise direction as they move downwardly. When the head member and shaft have been forced downwardly to a point where the rollers 11 are carried to the ends of the grooves 8, spring stop members 13, positioned at the ends of the said grooves prevent the said rollers from moving upwardly in these same grooves. The spring stop members are secured to the inner walls of the grooves 7 and 8 at points immediately adjacent the juncture of their top and bottom ends. After the shaft 9 has been depressed to a point where the rollers 11 pass over the lower spring stop members 13, the latter again spring outwardly and prevent the said rollers from proceeding upwardly in the same grooves 8 they traveled downwardly in. As the downward pressure is released from the head member 10, the contracted spiral spring 12 forces the shaft 9 in an upward direction, thereby causing the rollers to pass into grooves 7 and move upwardly therethrough to the top ends of the latter, where they pass over similar stop members 13 positioned at the juncture of grooves 7 and 8. The head member 10 and shaft 9 are thereby caused to rotate in the same direction as that imparted to them upon their downward movement. The upper spring stop members 13 again cause the rollers to pass into grooves 8 when the downward pressure is again exerted against the head member 10. Thus upon the upward and downward movement of the head member, the latter is rotated in the same direction, thereby causing the inside of the fruit from which the juice is being extracted to be properly removed from the skin thereof by the frictional engagement of the corrugated head members. The juice and pulp extracted from the fruit passes into the bowl 1 from which it may be conveniently poured. During each complete upward or downward stroke of the shaft 9 the head member 10 makes one revolution. The spring stop members 13 are each adapted to lie flatly against the wall of the groove 7 or 8 because of a depression therein at a point opposite the curved end of the said member. The rollers 11 are permitted to pass over the stop members when moving in a certain direction, but they cannot proceed in a reverse direction in the same grooves because the stop members are positioned to make such a movement impossible.

It is apparent to those skilled in the art that my improved fruit juice extractor is capable of being embodied in other forms equally as satisfactory as the one shown and described herein, so for this and other apparent reasons I desire my invention included broadly within the spirit of the appended claims.

Having described my invention what I claim is:

1. A fruit juice extractor comprising a receptacle, an upwardly disposed flange secured to the receptacle, the said flange having an opening extending longitudinally therein, the walls of the said opening having right and left hand intersecting grooves therein, a shaft mounted for upward and downward reciprocating motion in the opening, a head member carried by the shaft, projecting means carried by the shaft and extending into the grooves for imparting rotary motion to the shaft as it is moved upwardly or downwardly, spring means adjacent the juncture of the grooves for preventing the reverse movement of the projecting means in the same grooves, whereby the shaft and its head may be prevented from rotating in a reverse direction after the projecting means carried by the shaft has once passed the spring means, and means for automatically moving the shaft in an upward direction.

2. A fruit juice extractor comprising a receptacle having a projecting member extending vertically from its bottom side, the said projecting member having a vertical opening therein, a shaft mounted in the opening and adapted to move upwardly and downwardly with reciprocating motion, a head carried by the shaft, a series of right and left hand spiral grooves located in the wall of the opening and roller means projecting into grooves, the said roller means being adapted to move longitudinally in the grooves when the shaft is moved upwardly or downwardly whereby the shaft and head may be rotated as they move upwardly or downwardly with reciprocating motion, and a spring interposed between the shaft and the bottom of the receptacle for moving the shaft and head in an upward direction.

WALTER KAZOIAN.